US008396700B2

(12) United States Patent
Chakrabarty et al.

(10) Patent No.: US 8,396,700 B2
(45) Date of Patent: Mar. 12, 2013

(54) AGGREGATE SIMULATION

(75) Inventors: Rajan K. Chakrabarty, Reno, NV (US); Hans Moosmuller, Reno, NV (US); Mark Anthony Garro, Reno, NV (US); Christopher M. Herald, Reno, NV (US)

(73) Assignee: Board of Regents of the Nevada System of Higher Education, on behalf of the Desert Research Institute, Reno, NV (US)

( * ) Notice: Subject to any disclaimer, the term of this patent is extended or adjusted under 35 U.S.C. 154(b) by 541 days.

(21) Appl. No.: 12/543,205

(22) Filed: Aug. 18, 2009

(65) Prior Publication Data
US 2010/0057421 A1 Mar. 4, 2010

Related U.S. Application Data

(60) Provisional application No. 61/093,629, filed on Sep. 2, 2008.

(51) Int. Cl.
*G06G 7/58* (2006.01)
*G01N 33/48* (2006.01)
*G01N 33/50* (2006.01)

(52) U.S. Cl. ............................................ 703/11; 702/19
(58) Field of Classification Search ........................ None
See application file for complete search history.

(56) References Cited

U.S. PATENT DOCUMENTS

| 1,558,382 | A | 10/1925 | Marx |
| 3,532,614 | A | 10/1970 | Shirley |
| 4,290,882 | A | 9/1981 | Dempsey |
| 4,618,432 | A | 10/1986 | Mintz et al. |
| 5,421,972 | A | 6/1995 | Hickey et al. |
| 6,001,266 | A | 12/1999 | Bier |
| 6,692,627 | B1 | 2/2004 | Russell et al. |
| 6,797,908 | B2 | 9/2004 | Yan et al. |
| 6,831,273 | B2 | 12/2004 | Jenkins et al. |
| 7,213,476 | B2 | 5/2007 | Cheng et al. |
| 7,386,863 | B2 | 6/2008 | Bodin et al. |
| 2004/0038264 | A1 | 2/2004 | Souza et al. |
| 2004/0198887 | A1 | 10/2004 | Brown et al. |
| 2005/0036924 | A1 | 2/2005 | Nilsen et al. |
| 2007/0043520 | A1 | 2/2007 | Friedlander et al. |
| 2007/0148962 | A1 | 6/2007 | Kauppinen et al. |
| 2008/0011876 | A1 | 1/2008 | Ostraat |

FOREIGN PATENT DOCUMENTS

WO    WO2008005283    1/2008

OTHER PUBLICATIONS

Brasil et al. J. Aerosol Sci. vol. 30, No. 10, pp. 1379-1389, 1999.*
Oh et al. Journal of Colloid and Interface Science, vol. 193, Issue 1, 1997, pp. 17-25.*
Aitken, et al., "Manufacture and use of nanomaterials: current status in the UK and global trends," Occupational Medicine, 56:300-306 (2006).
Brasil, et al., "Evaluation of the fractal properties of cluster-cluster aggregates," Aerosol Science and Technology, 33:440-454 (2000).

(Continued)

*Primary Examiner* — Michael Borin
(74) *Attorney, Agent, or Firm* — Ryan A. Heck; UNR-DRI Technology Transfer Office

(57) ABSTRACT

The present disclosure provides, among other things, a method for generating a simulated aggregate based on one or more input parameters. A test aggregate is constructed and rotated. Stable orientations of the aggregate on a surface are determined. In specific examples, two-dimensional properties are calculated for stable orientations of the test aggregate and stored or displayed. In particular implementations of the method, the test aggregate is constructed through successive monomer addition.

8 Claims, 4 Drawing Sheets

OTHER PUBLICATIONS

Cai, et al., "Comparison of size and morphology of soot aggregates as determined by light scattering and electron microscope analysis," *Langmuir*, 9(11):2861-2867 (1993).

Camata, et al., "Deposition of nanostructured thin film from size-classified nanoparticles," NASA 5th Conference on Aerospace Materials, Processes, and Environmental Technology (Nov. 2003).

Chakrabarty, et al., "FracMAP: A user-interactive package for performing simulation and orientation-specific morphology analysis of fractal-like solid nano-agglomerates," *Computer Physics Communications*, 180:1376-1381 (2009).

Chakrabarty, R.K., et al., "Morphology Based Particle Segregation by Electrostatic Charge," *J. Aerosol Sci.*, 39, 785-792 (2008).

Chakrabarty, et al., "Emissions from the laboratory combustion of wildland fuels: Particle morphology and size," *J. Geophys. Res.*, 111:D07204 (2006).

Chapot, et al., "Electrostatic potential around charged finite rodlike macromolecules: nonlinear Poisson-Boltzmann theory," *Journal of Colloid and Interface Science*, 285:609-618 (2005).

DeCarlo, et al., "Particle morphology and density characterization by combined mobility and aerodynamic diameter measurements. Part 1: theory," *Aerosol Science and Technology*, 38:1185-1205 (2004).

Dhaubhadel, et al., "Hybrid superaggregate morphology as a result of aggregation in a cluster-dense aerosol," *Physical Review E*, 73:011404-1-011404-4 (2006).

Ebbesen, et al., "Large-scale synthesis of carbon nanotubes," *Nature*, 358:220-222 (1992).

Forrest, et al., "Long-range correlations in smoke-particle aggregates," *J. Phys, A: Math. Gen.*, 12(5):L109-L117 (1979).

Height, et al., "Flame synthesis of single-walled carbon nanotubes," *Carbon*, 42:2295-2307 (2004).

Hwang, et al., "Separation of nanoparticles in different sizes and compositions by capillary electrophoresis," *Bull. Korean Chem. Soc.*, 24(5):684-686 (2003).

Intra, et al., "An overview of aerosol particle sensors for size distribution measurement," *Mj. Int. J. Sci. Tech.*, 01(02):120-136 (2007).

Kindratenko, et al., "Fractal dimensional classification of aerosol particles by computer-controlled scanning electron microscopy," *Environ. Sci. Technol.*, 28(12):2197-2202 (1994).

Knutson, et al., "Aerosol classification by electric mobility: apparatus, theory, and applications," *Aerosol Sci.*, 6:443-451 (1975).

Kousaka, et al., "Bipolar charging of ultrafine aerosol particles," *Aerosol Science and Technology*, 2:421-427 (1983).

Köylü, et al., "Optical properties of overfire soot in buoyant turbulent diffusion flames at long residence times," *Transactions of the ASME Journal of Heat Transfer*, 116:152-159 (1994).

Köylü, et al., "Fractal and projected structure properties of soot aggregates," *Combustion and Flame*, 100:621-633 (1995).

Liu, et al., "Separation and study of the optical properties of silver nanocubes by capillary electrophoresis," *Chemistry Letters*, 33(7):902-903 (2004).

Oh, et al., "The effect of overlap between monomers on the determination of fractal cluster morphology," *Journal of Colloid and Interface Science*, 193:17-25 (1997).

Pierce, "Aggregation in colloids and aerosols," Dissertation, Dept. of Physics, Kansas State University, Manhattan, Kansas (2007).

Rodrigues, et al., "Measurement of the electrostatic charge in airborne particles: II—particle charge distribution of different aerosols," *Brazilian Journal of Chemical Engineering*, 23(01):125-133 (2006).

Rogak, et al., "Bipolar diffusion charging of spheres and agglomerate aerosol particles," *J. Aerosol Sci.*, 23(7):693-710 (1992).

Rogak, et al., "The mobility and structure of aerosol agglomerates," *Aerosol Science and Technology*, 18:25-47 (1993).

Samson, et al., "Structural analysis of soot agglomerates," *Langmuir*, 3(2):272-281 (1987).

Slowik, et al., "An inter-comparison of instruments measuring black carbon content of soot particles," *Aerosol Science and Technology*, 41:295-314 (2007).

Sorensen, "Light scattering by fractal aggregates: A review," *Aerosol Science and Technology*, 35:648-687 (2001).

Wang, et al., "Scanning electrical mobility spectrometer," *Aerosol Science and Technology*, 13:230-240 (1990).

Wen, et al., "Bipolar diffusion charging of fibrous aerosol particles—II. Charge and electrical mobility measurements on linear chain aggregates," *J. Aerosol Sci.*, 15(2):103-122 (1984).

Yeh, et al., "Theoretical study of equilibrium bipolar charge distribution on nonuniform primary straight chain aggregate aerosols," *Aerosol Science and Technology*, 2:383-388 (1983).

Zelenyuk, et al., "On the effect of particle alignment in the DMA," *Aerosol Science and Technology*, 41:112-124 (2007).

* cited by examiner

| Nproj | Area | N | Lmax | Wmax | 2d D (Box Counting) | R^2 | 2d D (Hybrid) | R^2 | 2d D (Perimeter) | R^2 | 3d D | 2d Rg | 3d Rg |
|---|---|---|---|---|---|---|---|---|---|---|---|---|---|
| 19.2896 | 60 | 25 | 18.8736 | 13.64 | 1.64847 | 0.986 | 1.87605 | 1 | 1.00031 | 0.9997 | 1.78 | 5.14176 | 5.28086 |
| 10.8926 | 34 | 25 | 10.3365 | 7.2 | 1.79846 | 0.982 | 1.90041 | 0.99982 | 1.03051 | 0.9991 | 1.78 | 2.45408 | 5.28086 |
| 9.98221 | 31 | 25 | 9.83064 | 6.34114 | 1.77141 | 0.978 | 1.90182 | 1 | 1.01542 | 0.9989 | 1.78 | 2.34432 | 5.28086 |
| 18.3729 | 57 | 25 | 18.9198 | 16.4104 | 1.68347 | 0.992 | 1.88546 | 0.99898 | 1.03273 | 0.9997 | 1.78 | 5.11598 | 5.28086 |
| 17.6548 | 55 | 25 | 18.876 | 12.2772 | 1.58925 | 0.99 | 1.89229 | 0.9999 | 1.00694 | 0.9996 | 1.78 | 5.13614 | 5.28086 |
| 16.9914 | 53 | 25 | 18.9186 | 10.5513 | 1.61575 | 0.989 | 1.91712 | 0.99983 | 1.00351 | 0.9997 | 1.78 | 5.14952 | 5.28086 |
| 20.2509 | 63 | 25 | 18.8567 | 16.8567 | 1.71893 | 0.988 | 1.91249 | 0.99983 | 1.01225 | 0.9996 | 1.78 | 5.14598 | 5.28086 |
| 10.5806 | 33 | 25 | 10.1025 | 7.54255 | 1.7804 | 0.982 | 1.90805 | 0.99993 | 1.03046 | 0.9991 | 1.78 | 2.47489 | 5.28086 |
| 10.8512 | 34 | 25 | 10.8617 | 5.68507 | 1.76445 | 0.98 | 1.90542 | 0.99983 | 1.03088 | 0.9996 | 1.78 | 2.55818 | 5.28086 |
| 19.6366 | 61 | 25 | 18.9553 | 7.7668 | 1.67774 | 0.992 | 1.92281 | 0.99979 | 0.995612 | 0.9995 | 1.78 | 5.11525 | 5.28086 |
| 17.0009 | 53 | 25 | 18.7869 | 19.7869 | 1.69326 | 0.991 | 1.91525 | 0.99975 | 1.00782 | 0.9998 | 1.78 | 5.15946 | 5.28086 |
| 17.0633 | 53 | 25 | 18.9047 | 16.9047 | 1.67686 | 0.991 | 1.92049 | 0.99965 | 1.014 | 0.9997 | 1.78 | 5.18726 | 5.28086 |
| 16.4238 | 57 | 25 | 18.8146 | 14.3377 | 1.68029 | 0.992 | 1.92426 | 0.99968 | 1.00285 | 0.9997 | 1.78 | 5.12365 | 5.28086 |
| 9.72438 | 30 | 25 | 9.82304 | 5.85483 | 1.77103 | 0.976 | 1.92547 | 0.99967 | 1.02994 | 0.9995 | 1.78 | 2.34507 | 5.28086 |
| 11.4464 | 35 | 25 | 11.552 | 9.55136 | 1.78726 | 0.985 | 1.92556 | 0.99971 | 1.01805 | 0.9997 | 1.78 | 2.72028 | 5.28086 |
| 20.0185 | 62 | 25 | 18.3331 | 15.283 | 1.59637 | 0.993 | 1.92287 | 0.99953 | 1.01544 | 0.9997 | 1.78 | 5.10037 | 5.28086 |
| 13.2863 | 41 | 25 | 12.6 | 7.70779 | 1.81457 | 0.987 | 1.92582 | 0.99966 | 1.01894 | 0.9998 | 1.78 | 3.04717 | 5.28086 |
| 16.7909 | 52 | 25 | 18.8514 | 11.8966 | 1.61183 | 0.988 | 1.92498 | 0.99979 | 1.01422 | 0.9998 | 1.78 | 5.14176 | 5.28086 |
| 20.3496 | 63 | 25 | 18.5499 | 14.4471 | 1.71828 | 0.989 | 1.93777 | 0.99976 | 1.00511 | 0.9996 | 1.78 | 5.07511 | 5.28086 |
| 17.2778 | 54 | 25 | 18.2788 | 16.2788 | 1.53351 | 0.99 | 1.94298 | 0.9996 | 1.03905 | 0.9999 | 1.78 | 5.04493 | 5.28086 |
| 15.7035 | 56 | 25 | 18.876 | 9.81529 | 1.65317 | 0.98 | 1.94743 | 0.95953 | 0.985814 | 0.9995 | 1.78 | 5.12294 | 5.28086 |
| 17.4625 | 54 | 25 | 18.8689 | 12.9541 | 1.61093 | 0.992 | 1.94659 | 0.99972 | 0.983316 | 0.9996 | 1.78 | 5.13466 | 5.28086 |
| 17.2874 | 54 | 25 | 18.7371 | 9.31933 | 1.60491 | 0.989 | 1.94895 | 0.99957 | 1.00349 | 0.9996 | 1.78 | 5.14852 | 5.28086 |
| 19.9771 | 62 | 25 | 18.9248 | 7.05762 | 1.69783 | 0.992 | 1.9440? | 0.99966 | 1.03754 | 0.9999 | 1.78 | 5.10601 | 5.28086 |
| 17.4275 | 54 | 25 | 18.8934 | 6.97083 | 1.6568 | 0.989 | 1.95014 | 0.99952 | 0.987447 | 0.9995 | 1.78 | 5.13604 | 5.28086 |

FIG. 4

AGGREGATE SIMULATION

CROSS REFERENCE TO RELATED APPLICATIONS

This application claims the benefit of, and incorporates by reference, U.S. Provisional Patent Application No. 61/093,629, filed Sep. 2, 2008.

FIELD

The present disclosure relates, generally, to a method, and a device for implementing the method, for simulating aggregates. In a specific example, the method is used to simulate aggregates by determining stable orientations of the aggregates.

BACKGROUND

Morphology can be an important property in particle-related applications. The experimental determination of the fractal properties of nano-aggregates has been of interest for scientists and engineers as it can influence the physical and chemical properties of the aggregates. For example, morphology may be a factor in aerosol synthesis, which can be used for bulk production of nanomaterials, such as in—1) pharmaceuticals synthesis and processing, where the ability to control the size and state of aggregates can influence their behavior in the human body; 2) synthesis of printer toners, tires, paints, fillers, and fiber-optics products, where nanopowders morphology uniformity can influence product quality; and 3) carbon nanotube manufacturing, where uniformly sized and shaped carbon nanotubes may have desirable properties.

When used to produce particles beyond a certain length, aerosol formation mechanisms can produce aggregates. Aggregates can have complex, fractal-like morphologies, and particles having the same mass, such as being composed of the same number of individual particles, can have different morphologies, such as being more spherically or more linearly shaped.

Fractal mathematics have been used to quantify the morphology of solid nano-aggregates. For example, the Hausdorff or mass fractal dimension D can be used to characterize the complex shapes of nano-aggregates with:

$$N=k_0(R_g/d_p)^D$$

where N is the number of monomers in an aggregate, D is the non-integer mass fractal dimension, $k_0$ is the fractal prefactor, $d_p$ is the monomer diameter, and $R_g$ is the radius of gyration of an aggregate.

Aggregates' fractal properties are often determined through quantitative analysis of digitized ex situ transmission/scanning electron microscopy (TEM/SEM) images and/or in situ light scattering measurements. Analysis of electron micrographs typically involves extraction of three-dimensional (3-d) structural and geometrical properties of aggregates, which are commonly unknown, from their two-dimensional (2-d) projected images.

It can be time consuming and difficult to accurately determine the morphology of aggregates. Commonly, to completely determine the shape of an aggregate, multiple two-dimensional images are obtained of an aggregate and composited to produce a three-dimensional representation of the object. Although some studies discuss simulation of aggregates, they can suffer from drawbacks. For example, one study discusses the simulation of aggregate formation under various regimes. The computational resources for such simulations can be rather high. Further, although the simulations purport to simulate the particles as they exist in a fluid, such as air, they do not appear to describe how the particles might appear when located on the surface, such as the surface of a filter or other collection device. Thus, the results of such simulations may not correlate with experimental data.

SUMMARY

In one embodiment, the present disclosure provides a method of generating a simulated aggregate based on input parameters, such as one or more of mass fractal dimension, prefactor, fractal size (such as the number of monomer units), radius of gyration, and the radii of the aggregate's constituent monomers. In particular methods, the input parameters can be obtained from empirical data, such as data from a physical aerosol sample or can be chosen to design aggregates with certain desirable properties such as certain physical and/or chemical properties.

In a specific implementation, the method involves constructing a test aggregate, rotating the test aggregate, and determining whether the rotated test aggregate could stably rest on a surface. Aggregates meeting these criteria are designated candidate aggregates. In a more specific example, two-dimensional properties are calculated for candidate aggregates and, optionally, stored or displayed.

In another embodiment, the present disclosure provides a method for simulating the structure of an aggregate based on three-dimensional properties, such as an empirically determined three-dimensional property. In a specific implementation, the method involves constructing a test aggregate, rotating the test aggregate, and determining whether the rotated test aggregate could stably rest on a surface. Aggregates meeting these criteria are designated candidate aggregates. In a more specific example, two-dimensional properties are calculated for candidate aggregates and, optionally, stored or displayed. In another example, the two-dimensional properties are compared with experimentally determined properties and the differences used to adjust the empirically determined three-dimensional property. The process may then be repeated with the adjusted three-dimensional property. In some implementations, the entire process is repeated until the calculated two-dimensional properties are within a specified value of an experimentally determined two-dimensional properties or until iterations of the process return values differing by less than a threshold amount.

The present disclosure also provides a computer implemented method, wherein the method is one of the methods described above. The present disclosure also provides a method of storing computer-readable medium computer-executable instructions for causing a computer system programmed thereby to perform acts comprising one of the methods described above. In some embodiments, the computer implemented method includes the step of storing the calculated two-dimensional properties or candidate aggregate structures on a computer-readable medium or transmitting such information over a communication medium, such as the internet. In another embodiment, the computer implemented method includes the step of outputting the calculated two-dimensional properties or candidate aggregate structures, such as to a computer display or printing device.

In another embodiment, the present disclosure provides a tangible computer-readable storage medium storing computer-executable instructions for causing a computer system to perform one of the methods described above.

In another embodiment, the present disclosure provides a system comprising a processor and one or more storage media storing instructions for causing the processor to perform one of the methods described above.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. Any particular embodiment need not provide all features noted above, nor solve all problems or address all issues in the prior art noted above.

BRIEF DESCRIPTION OF THE DRAWINGS

FIG. 4 is a table of the output of a specific example of a computer program running an implementation of the disclosed method.

DETAILED DESCRIPTION

Figure 1:
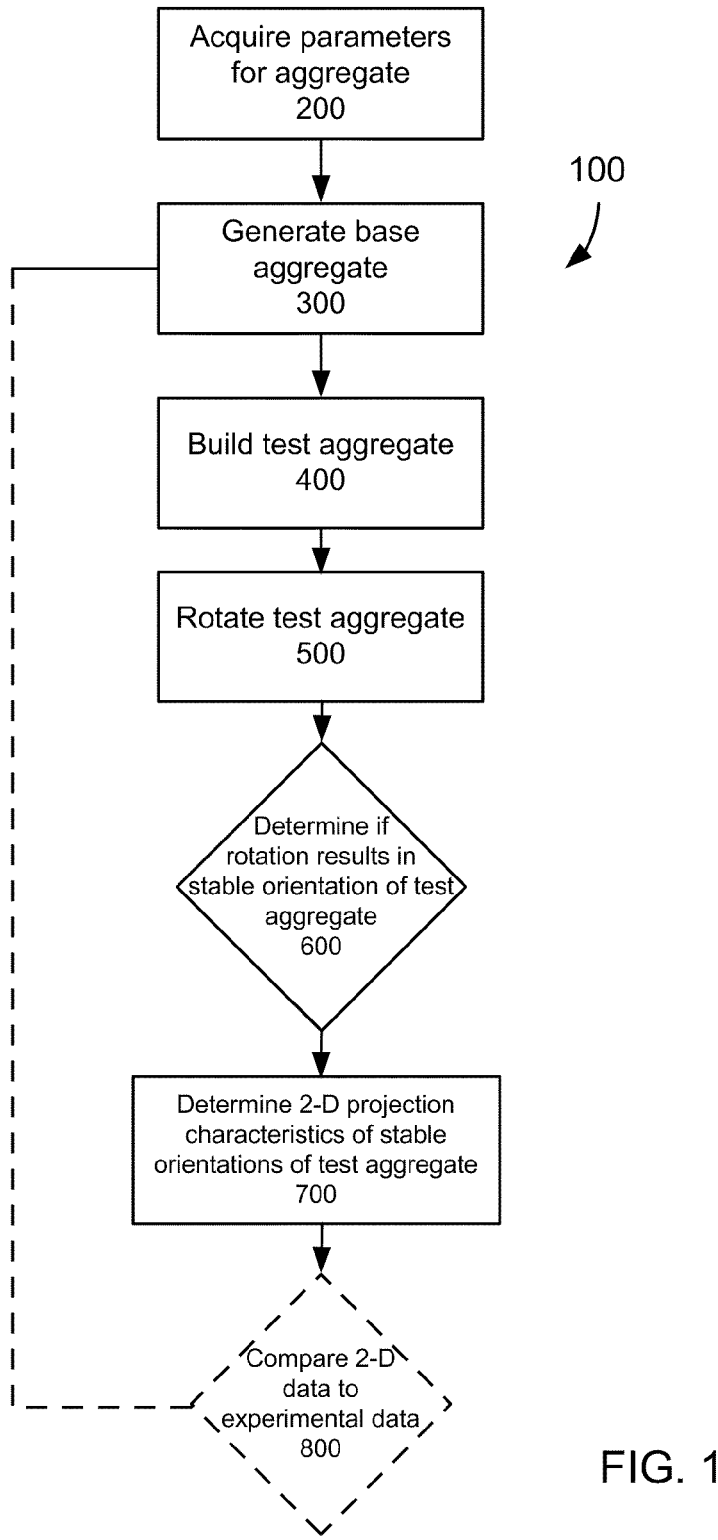
FIG. 1 is a flowchart of an embodiment of the disclosed method for simulating an aggregate.

Unless otherwise explained, all technical and scientific terms used herein have the same meaning as commonly understood by one of ordinary skill in the art to which this disclosure belongs. In case of any such conflict, or a conflict between the present disclosure and any document referred to herein, the present specification, including explanations of terms, will control. The singular terms "a," "an," and "the" include plural referents unless context clearly indicates otherwise. Similarly, the word "or" is intended to include "and" unless the context clearly indicates otherwise. The term "comprising" means "including;" hence, "comprising A or B" means including A or B, as well as A and B together. All numerical ranges given herein include all values, including end values (unless specifically excluded) and intermediate ranges.

Although methods and materials similar or equivalent to those described herein can be used in the practice or testing of the present disclosure, suitable methods and materials are described herein. The disclosed materials, methods, and examples are illustrative only and not intended to be limiting.

"Aerosol" refers to a dispersion of particles in a fluid medium, such as a gas, or in a vacuum. In some examples, the gas is air. Aerosols may be formed by a variety of methods, including ablation, flame synthesis, spray drying of colloidal or precipitated particles, spray pyrolysis, and thermal evaporation. The particle concentration in the aerosol is typically selected to provide suitable particle separation in the method of the present disclosure, or based on how the particles will be used after separation. In some examples the particle concentration is between about $10^1$ particles/$cm^3$ and about $10^{13}$ particles/$cm^3$, such as between about $10^4$ particles/$cm^3$ and about $10^{11}$ particles/$cm^3$ or between about $10^7$ particles/$cm^3$ and about $10^9$ particles/$cm^3$.

"Nanostructure" refers to a solid structure having a cross sectional diameter of between about 0.5 nm to about 500 nm. Nanostructures may be made from a variety of materials, such as carbon, silicon, and metals, including, without limitation, titanium, zirconium, aluminum, cerium, yttrium, neodymium, iron, antimony, silver, lithium, strontium, barium, ruthenium, tungsten, nickel, tin, zinc, tantalum, molybdenum, chromium, and compounds and mixtures thereof. Suitable materials that also are within the definition of nanostructures include transition metal chalcogenides or oxides, including mixed metal and/or mixed chalcogenide and/or mixed oxide compounds or carbonaceous compounds, including elemental carbon, organic carbon, and fullerenes, such as buckyballs, and related structures. In particular examples, the nanostructure is made from one or more of zinc oxide, titanium dioxide, gallium nitride, indium oxide, tin dioxide, magnesium oxide, tungsten trioxide, and nickel oxide.

The nanostructure can be formed in a variety of shapes. In one implementation, the nanostructures are wires, such as wires having at least one cross sectional dimension less than about 500 nm, such as between about 0.5 nm and about 200 nm. Nanowires can be nanorods, having a solid core, or nanotubes having a hollow core. In some implementations, the cross sectional dimension of the nanostructure is relatively constant. However, the cross sectional dimension of the nanostructure can vary in other implementations, such as rods or tubes having a taper.

As used herein, "particle" refers to a small piece of an element, compound, or other material. Particles that may be used in the present disclosure include those having a size, such as a cross-sectional diameter, of between about 0.5 nm and about 1 mm, such as between about 50 nm and about 100 μm, between about 500 nm and about 10 μm, or between about 200 nm and about 700 nm. The shape or morphology of the particles can be expressed in terms of the volume-to surface area ratio, or density fractal dimension. Typical particles have a fractal dimension of between about 1 and about 3, typically greater than 1 and less than 2, such as between about 1.2 and about 1.8. The particles may be of any form, such as powders, granules, pellets, strands, or flocculent materials. The particles may be individual, discrete units, agglomerations of multiple units, or mixtures thereof. Particle aggregates can assume a number of shapes. As the number of particles in the aggregate increases, the number of potential morphologies also typically increases. Even relatively small aggregates typically can exist in a number of different morphologies. When the morphology plays a role in the function of the particles, morphological separation may be important, and difficult to achieve using prior methods.

The particles may be of any desired material that can be charged for the separation process, or that is mixed with such a material. For example, the particles may be, or include, carbonaceous materials, ceramics (such as metal borides, carbides, or nitrides), extenders, fillers, inorganic salts, metals, metal alloys, metal alkoxides, metal oxides, pigments, polymers, zeolites, or combinations and mixtures thereof. Specific examples of such materials include aluminum, antimony oxide, asbestos, attapulgite, barium sulfate, boehmite, calcium carbonate, chalk, carbon black, chromium, cobalt, copper, diatomaceous earth, fumed oxides, gold, halloysite, iron, iron oxides, kaolin, molybdenum, montmorillonite, nickel, niobium, palladium, platinum, silica, silica aerogels, silica sols, silicon, silver, tantalum, titania, titanium, titanium isopropoxide, zinc oxide, zinc sulfide, or alloys, mixtures, or combinations thereof.

In some examples, the particles can be used to form nanostructures, such as nanorods or nanotubes.

In some examples, the particles are aerosols, such as combustion particles, such as carbon black. In other examples, the particles are nanostructures.

"Aggregate" refers to collection of smaller elements, such as particles, that have come together to form a larger mass. Each element of the aggregate is typically in contact with at least one other element of the aggregate. In some cases, the individual elements are referred to as monomers. In some embodiments, the monomers are all of the same type. In other embodiments, the aggregate is composed of monomers of different types.

In a specific example, the aggregates are particle aggregates, such as aggregates of aerosol particles, such as soot or dust particles. In another specific example, the aggregates of aggregates of nanostructures.

"Fractal" refers to a material that has a property of self-similarity, where viewing the material at different scales presents a similar morphological structure. Thus, in some cases, "fractal" is used to refer to materials that are not fractal in a strict sense. In other cases, "fractal" refers to fractals that have the same or substantially the same morphological structures when viewed at different scales.

"Mass Fractal dimension" refers to a parameter, designated D, that describes the scaling law power by which the mass of an aggregate varies as a function of its linear size. In one example, mass fractal dimension is represented by the equation:

$$N = k_0 (R_g/d_p)^D$$

where N is the number of monomers in an aggregate, D is the non-integer mass fractal dimension, $k_0$ is the fractal prefactor, $d_p$ is the monomer diameter, and $R_g$ is the radius of gyration of an aggregate.

"Two-dimensional properties" refers to one or more characteristics useful for classifying aggregates or fractals based on their two-dimensional properties. "Density fractal dimension" refers to a parameter that describes the space-filling characteristics of an aggregate. "Textural fractal dimension" can be used to describe the two-dimensional texture of the aggregates, with values closer to 2 representing more smooth or circular aggregates. Two-dimensional properties can be used, for example, to describe whether an aggregate is more linearly or spherical shaped. For example, aggregates having density fractal dimensions between about 1.5 and about 1.9 and textural fractal dimensions between about 1.05 and about 1.4 typically indicate linear, chain-like aggregates.

Two-dimensional properties also include parameters that can be used to describe the shape of the aggregate, such as its aspect ratio, root form factor, and roundness. Two-dimensional parameters also include the maximum projected width, maximum projected length, projected area, and perimeter length. Two dimensional properties can also include images, such as simulated images, of the aggregates. In one example, the image is a two-dimensional projection of the three-dimensional structure of the aggregate.

Two-dimensional properties can be calculated from experimental data or can be calculated from simulations or from set parameters, such as using a method of the present disclosure.

"Three-dimensional properties" refers to one or more characteristics useful for classifying aggregates or fractals based on their three-dimensional properties. One three-dimensional property is the mass fractal dimension of the aggregate. Three-dimensional properties, such as mass fractal dimension, can be determined from experimental data, such as multiple two-dimensional images of an aggregate, or can be empirically determined, such as based on two-dimensional properties. Empirical methods are discussed in Köylü et al., Combustion and Flame 100, 621 (1995); Brasil et al., Journal of Aerosol Science 30, 1379 (1999); and Oh et al., Journal of Colloid and Interface Science 193, 17 (1997); each of which is incorporated by reference herein to the extent not inconsistent with the present disclosure.

Three-dimensional properties can also include three-dimensional images of the aggregate or the radius of gyration of the aggregate.

General Discussion

Although some recent efforts have sought to formulate generalized recipes to help infer three-dimensional fractal properties from the aggregate's two-dimensional projected properties, these efforts typically suffer from various shortcomings. For example, empirical findings may not take into account the orientation effects of the aggregates collected on a filter medium for electron microscopy. The process of collecting aggregates onto filter media commonly results in aggregates reaching a stable resting position with multiple contact points with the filter surface. This may be caused, for example, by an angular reorientation of the aggregate if the initial contact between the primary particle touching the filter surface and the surface is not rigid and residual angular momentum relative to the contact point and/or additional forces, for example from molecular or particle collisions, acting on the aggregate. The projected properties of an aggregate oriented to rest in a stable position are typically larger than its projected properties averaged over random orientations. Thus, the present disclosure provides a method to account for aggregate-surface interactions when simulating particles shapes and orientations.

In one embodiment, the present disclosure provides a method of generating a simulated aggregate based on input parameters, such as one or more of mass fractal dimension, prefactor, fractal size (such as the number of monomer units), radius of gyration, and the radii of the aggregate's constituent monomers.

In a specific implementation, the method involves constructing a test aggregate, rotating the test aggregate, and determining whether the rotated test aggregate could stably rest on a surface. Aggregates meeting these criteria are designated candidate aggregates. In a more specific example, two-dimensional properties are calculated for candidate aggregates and, optionally, stored or displayed.

In another embodiment, the present disclosure provides a method for simulating the structure of an aggregate based on three-dimensional properties, such as an empirically determined three-dimensional property. In a specific implementation, the method involves constructing a test aggregate, rotating the test aggregate, and determining whether the rotated test aggregate could stably rest on a surface. Aggregates meeting these criteria are designated candidate aggregates. In a more specific example, two-dimensional properties are calculated for candidate aggregates and, optionally, stored or displayed. In another example, the two-dimensional properties are compared with experimentally determined properties and the differences used to adjust the empirically determined three-dimensional property. The process may then be repeated with the adjusted three-dimensional property. In some implementations, the entire process is repeated until the calculated two-dimensional properties are within a specified value of the experimentally determined two-dimensional properties or until iterations of the process return values differing by less than a threshold amount.

The present disclosure also provides a computer implemented method, wherein the method is one of the methods described above. In one example, the computer is a commercially available personal computer, such as a computer having an Intel (Santa Clara, Calif.) or AMD (Sunnyvale, Calif.) processor and running a Windows (Microsoft Corp., Redmond Wash.) or Linux (available from RedHat Corp., Raleigh, N.C.) operating system.

The present disclosure also provides a method of storing computer-readable medium computer-executable instructions for causing a computer system programmed thereby to perform acts comprising one of the methods described above. In some embodiments, the computer implemented method includes the step of storing the calculated two-dimensional properties or candidate aggregate structures on a computer-readable medium or transmitting such information over a communication medium, such as the internet. Computer readable medium may include, without limitation, tangible storage devices and materials such as hard disks, floppy disks, flash media, optical media, such as CD or DVD media, memory cards (such as secure digital cards), RAM, ROM, EEPROM, or EPROM, In another embodiment, the computer implemented method includes the step of outputting the calculated two-dimensional properties or candidate aggregate structures, such as to a computer display or printing device.

In another embodiment, the present disclosure provides a tangible computer-readable storage medium storing computer-executable instructions for causing a computer system to perform one of the methods described above.

In another embodiment, the present disclosure provides a system comprising a processor and one or more storage media storing instructions for causing the processor to perform one of the methods described above.

Example Method

FIG. 1 presents a flowchart of a method 100 according to the present disclosure for determining two- or three-dimensional aggregate information, such as two-dimensional fractal information or simulating the structure of an aggregate. In step 200, parameters are acquired for an aggregate to be generated. Parameters may include the mass fractal dimension, the number of monomers, the radius of the monomers, or the prefactor. In some configurations, the monomers have the same properties. In other configurations, the monomers have different properties, such as different radii. In some cases, the aggregate parameters are obtained from a user, such as in response to a computer program query. In other examples, the parameters are obtained by other methods, such as in an automated manner from another computer process, from instrumental analysis of sample particles, from set parameters, or from empirical analysis of two-dimensional aggregate data.

In step 300, a base aggregate is generated. For example, two particles may be joined together to serve as the base aggregate. A test aggregate is built up from additional monomer units in process 400. Once the aggregate has been grown to the desired size, it is rotated in process 500. In process 600, each rotation of the aggregate is tested to determine whether it results in a stable aggregate. If so, that rotation of the particles is designated a candidate aggregate and, optionally, added to a store of stable aggregate configurations. If not, the rotation is discarded and the process 500 repeated. In process 700, two-dimensional parameters of interest are determined for stable particle configurations. In optional step 800, the generated parameters are compared with data. In some cases the comparison is used to update the input parameters for the method 100 and the method 100 returns to process 200 and repeats until a satisfactory result is obtained in step 800 or the method 100 is otherwise set to terminate.

Figure 2:
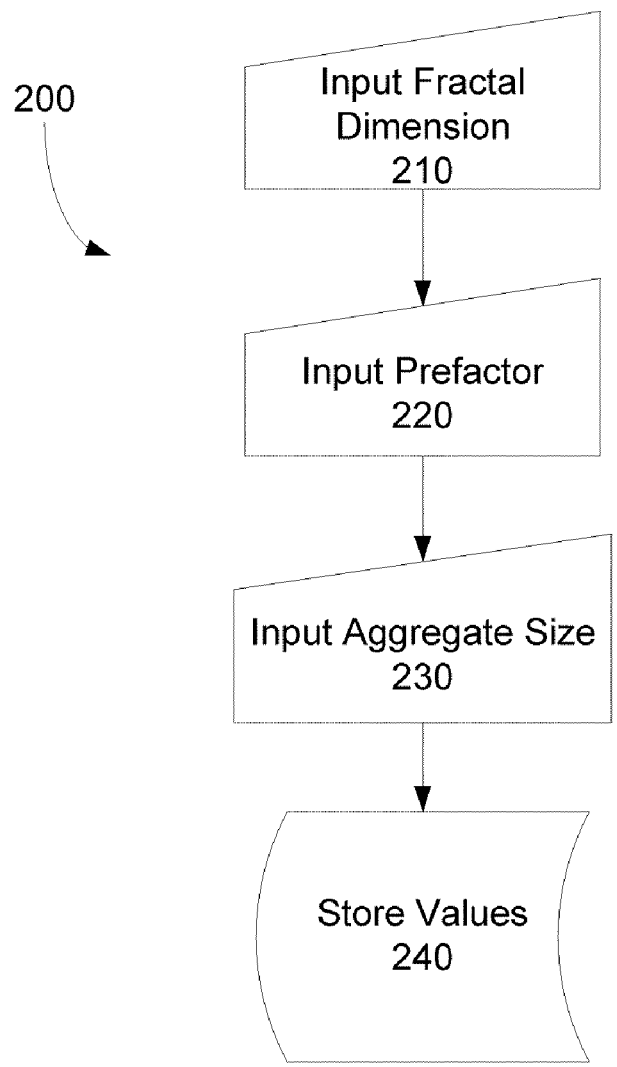
FIG. 2 is a flowchart of a process for acquiring input parameters for an embodiment of the disclosed method for simulating an aggregate.

FIG. 2 illustrates a flowchart of a process 200 for acquiring input parameters for the process 100. In step 210, values are input, such as by a user, for the fractal dimension, such as the mass fractal dimension, of the aggregate to be built and, optionally, tested by the process 100. In one example, the input of step 210 is a value between 1.0 and 2.0.

In step 220, values are input, such as by a user, for the fractal prefactor. In one example, the input of step 220 is a value greater than 1.0. In step 230, values are input, such as by a user, for the aggregate size. The aggregate size may be, for example, an integer value greater than 0, typically a value greater than 1 or a value greater than 2. In step, the values from steps 210 to 230 are stored, such as in computer memory or in a computer readable medium.

In other examples, one or more of the above parameters are not obtained or obtained from different sources. In further examples, additional or different parameters are obtained, such as the monomer radii.

Aggregate Formation

After receiving the appropriate parameters, the method 100 begins the process 300 for adding monomers to a base aggregate. The follow pseudocode represents the calling of the CreateFractal function, which creates a test aggregate to be rotated and further treated in steps 500-800 of the method 100 of FIG. 1.

```
CreateFractal(N,D,k,r)
    F = { }
    For i from 1 to N
    R_g = (i/k)^(1/D)*r
        F = AddNewMonomer (F,r,R_g)
```

The CreateFractal function calls the AddNewMonomer function, described further below. Pseudocode is also provides for an equation for the radius of gyration, $R_g$.

The AddNewMonomer function, described by the following pseudocode, takes different actions depending on whether the aggregate size, N, is 0, 1, or an integer greater than 1.

```
AddNewMonomer (F,r,R_g)
    If size(F) = 0
    F = {(0.0, 0.0, 0.0)}
    Else if size(F) = 1
        F = F union {NewRandomMonomer(F[0],2*r)}
    Else
        While (!(m = MonteCarlo(F,MIN_TRIALS,2*r, R_g)))
        F = F union {m}
        Return F
```

If the input of the aggregate size F is zero monomers, the method 100 creates a null set and ends. If the aggregate size F is one monomer, the process 300 creates a single monomer having a diameter of 2r using the NewRandomMonomer function. If the aggregate size is greater than one, the program calls the Monte Carlo function, which also calls the NewRandomMonomer function.

In a particular example, the process 300 of generating the base aggregate, or the first step in the process 400 of building the test aggregate, is represented by the following pseudocode:

```
NewRandomMonomer(c,R)
    z = Rand( ) * 2 * R – R
    phi = Rand( ) * 2 * PI
    theta = arcsin(z/R)
    x = R * cos(theta) * cos(phi)
    y = R * cos(theta) * sin(phi)
    return (x + c.x, y + c.y, z + c.z)
```

The NewRandomMonomer function takes a first monomer having a center c and a radius R and adds a second monomer at a random position on the spherical surface of the first monomer. The result of the NewRandomMonomer function is an aggregate composed of two point contacted monomers joined in a line.

When the aggregate size is greater than 1, generation of the base aggregate in the process 300 and the building up of the test aggregate is, in one example, controlled by a Monte Carlo process. Pseudocode for a suitable function, MonteCarlo, is presented below.

```
MonteCarlo(F,T,R,R_g)
    F_opt = F
    m = NULL
    For T trials
    Do
        rand_target = Rand_int(0,size(F) − 1)
        rand_monomer = NewRandomMonomer(F[rand_target],R)
        F' = union(F, {rand_monomer})
        While (!(NoOverlap(F',R /2)))
        If (m = NULL ||
            abs(calcRg(F') − R_g ) < abs(calcRg(F_opt) − R_g) )
            m = rand_monomer
            F_opt = F'
        If ( abs(calcRg(F_opt) − R_g) < EPSILON )
            Return m
        Else
            Return false
```

According to the pseudocode above, the Monte Carlo function is carried out for a certain number of trials, T. For each trial T, the Monte Carlo function randomly picks a monomer m of the existing aggregate as the target site for the addition of a new monomer to create a test agregate. The monomer is then added to the target site. In a specific example, the new monomer is added to an existing structure, or a new base aggregate created, using the NewRandomMonomer function described above. For example, when a new monomer is added to an existing aggregate, the new monomer is added at a random point on the surface of one of the monomers of the existing aggregate, which in some examples is treated as a spherical surface. The new monomer is thus point connected to the existing monomer in a line. In other examples, rather than being carried out for a particular number of trials, the Monte Carlo process government by another parameter, such as result quality or computing time.

The method then evaluates the test aggregate with the added monomer. In one implementation, the process 400 calculates whether the radius of gyration $R_g$ of the resulting aggregate equals, or is within a specified range of, a preset value, such as a value input by a user.

In one example of the process 400, if the radius of gyration meets the selected criteria, the test aggregate may subject to further consideration, such as whether it may be a candidate aggregate. If the radius of gyration does not meet the criteria, that aggregate is discarded. In another implementation, the program calculates whether the radius of gyration is better, such as closer to the specified radius of gyration, than previous trials. In one example, these results are used to order a list of aggregates for further consideration. In various examples, the program tracks a number o such aggregates, such as a predetermined number of aggregates or all aggregates meeting certain criteria, such as a range of radius of gyration. In another example, the program tracks all trials and may display to a user all or a portion of the results, including with data sufficient to allow the user to evaluate how closely each test aggregate meets particular criteria.

In another example, the process selects the test aggregate with the radius of gyration closest to the specified radius of gyration of gyration for further consideration. Subsequent test aggregates that do not have a closer radius of gyration may be discarded.

One example of a suitable function, calcRg, for generating the radius of gyration is represented by the following pseudocode:

```
calcRg(F)
    N = size(F)
    R_cm = (0.0, 0.0, 0.0)
    Rg_sum = 0
    For each m of F
        R_cm += m
    R_cm = (R_cm.x/N, R_cm.y/N, R_cm.z/N)
    For each m of F
        Rg_sum += (m.x − R_cm.x)^2 + (m.y − R_cm.y)^2 + (m.z − R_cm.z)^2
    Return Rg_sum/N
```

Another property of the test aggregate that may be tested by the process 400 is whether the added monomer is, at most, a point contact with the other monomers of the test aggregate. In other words, the program checks to make sure that the added monomer does not overlap with any existing monomer. Suitable pseudocode for this operation is represented below:

```
NoOverlap(F,r)
    For each element m of F
        For each element n of F such that !(n = m)
            If (Distance(m,n) < 2*r)
                Return False
    Return True
```

The NoOverlap function described in the pseudocode above uses a Distance function to determine whether two monomers are point contacts. Suitable pseudocode for the Distance function is represented below, where the Distance function computes the distance as the square root of the squared differences between the x, y, and z coordinates of the two monomers.

```
Distance(m1,m2)
Return sqrt((m1.x − m2.x)^2 + (m1.y − m2.y)^2 + (m1.z − m2.z)^2)
```

In some examples, the NewRandomMonomer and subsequent test aggregate evaluation steps are repeated for a predetermined number of times or until predetermined criteria have been met. Criteria may include time or until evaluation steps produce a desired result (such as a radius of gyration equal to or within a predetermined range of the input radius of gyration).

The NewRandomMonomer process is repeated until the test aggregate reaches the input size.

Rotate Aggregate

Once the test aggregate or set of test aggregates meeting the predetermined criteria are built up in the process 400, they are randomly rotated in process 500. In process 600 each rotation is subjected to a determination of whether the resulting rotated aggregate would be stable on a particular surface. Aggregates meeting this criteria are designated as candidate aggregates. Suitable pseudocode for these operations is presented below:

```
DoValidOrientation(F)
    Do
        RotateRandom(F)
    While(!IsBalanced(F))
    Return F
```

In the psuedocode above, the DoValidOrientation function performs two operations on the test aggregate F. First, the DoValidOrientation function calls the RotateRandom function to rotate the aggregate, corresponding to process 500. The DoValidOrientation functions then calls the IsBalanced function to determine whether the rotation is a valid orientation, corresponding to process 600. In a particular example, all trials meeting these two criteria are selected as aggregate candidates. In further examples, all qualifying trials are subject to additional analysis to narrow the pool of candidates or generate data with which to identify how closely a candidate aggregate may correlate to real aggregates produced under particular conditions.

The pseudocode below represents a particular implementation of the RotateRandom function for carrying out process 500:

```
RotateRandom(F)
    F = RotateAround(F,CM(F), RandomTheta( ),RandomPhi( ))
    Return F
```

The RotateRandom function calls the RotateAround function, which rotates the aggregate F around random values of theta and phi. Suitable pseudocode for carrying out the RotateAround operation is presented below:

```
RotateAround(F, Rcm, random_theta,random_phi)
    x = sin(random_phi)*cos(random_theta)
    y = sin(random_phi)*sin(random_theta)
    z = cos(random_phi)
    v = (x,y,z)
    reference = (0,0,1)
    euler_angle = acos(dot_product(reference,v)/magnitude(v))
    euler_axis = cross_product(reference,v)/
    (magnitude(v)*sin(euler_angle))
    q1 = euler_axis.x * sin(euler_angle/2)
    q2 = euler_axis.y * sin(euler_angle/2)
    q3 = euler_axis.z * sin(euler_angle/2)
    q4 = cos(euler_angle/2)
    phi = atan((q1*q3 + q1*q4), (q2*q3 - q1*q4))
    theta = acos(-q1^2 - q2^2 + q3^2 + q4^2)
    psi = -atan((q1*q3 - q2*q4),(q2*q3 + q1*q4))
    For every element p1 of F
        x1 = p1.x - Rcm.x
        y1 = p1.y - Rcm.y
        z1 = p1.z - Rcm.z
        new_x = x1 * cos(phi) + y1* sin(phi)
        new_y = -x1 * sin(phi) + y1 * cos(phi)
        x1 = new_x
        y1 = new_y
        new_y = y1 * cos(theta) + z1 * sin(theta)
        new_z = -y1 * sin(theta) + z1 * cos(theta)
        y1 = new_y
        z1 = new_z
        new_x = x1 * cos(psi) + y1 * sin(psi)
        new_y = -x1 * sin(psi) + y1 * cos(psi)
        x1 = new_x
        y1 = new_y
        p1.x = x1 + Rcm.x
        p1.y = y1 + Rcm.y
        p1.z = z1 + Rcm.z
    return F
```

According to the pseudocode above, given a phi and theta corresponding to a point on a sphere, RotateAround to creates a unit vector, v=<x,y,z>, with: x=sin(phi)*cos(theta), y=sin(phi)*sin(theta) and z=cos(phi). The rotation angle and Euler axis are determined to be the perpendicular axis and the angle between the positive z axis and this new vector v respectively. The Euler angle is determined as the inverse cosine of the dot product of z axis and the unit vector divided by the magnitude of the unit vector. The Euler axis is determined by dividing the cross product the z axis and the unit vector by the magnitude of the unit vector and the sine of the Euler angle. This operation also serves to normalize the Euler axis.

The Euler axis and Euler angle are then used to generate a rotation quaternion. Three elements of the quaternion are generated by taking the product of the x, y, and z coordinates, respectively, of the Euler axis and the sine of half the Euler angle. The final element of the quaternion is generated by taking the cosine of half the Euler angle. The quaternion can then be used to determine the rotation angles phi, theta, and psi, using the x-convention, where phi, theta, and psi represent rotations around the z-axis, the x-axis, and then the z-axis respectively. The RotateAround function then rotates every element of the test aggregate using the generated rotation angles.

The rotation process 500 is not limited to the Euler method described above, and other methods are used in further examples of the method 100. For example, another implementation uses a random unit quaternion created by the accept-reject method in 4-space. In this implementation, apart from F and the center of mass coordinates Rcm, the function RotateAround takes in as input a random unit quaternion. From this quaternion a rotation matrix is generated and is applied to each monomer of the fractal around the center of mass. Pseudocode for suitable functions using the quaternion approach is presented below. The DoValidOrientation function can be the same as in the previously described implementation.

```
RandomQuat( )
    seed1 = Rand ( )
    seed2 = Rand ( )
    seed3 = Rand ( )
    Quat.x = sqrt( 1 - seed1 ) * sin( 2 * PI * seed2 )
    Quat.y = sqrt( 1 - seed1 ) * cos( 2 * PI * seed2 )
    Quat.z = sqrt( seed1 ) * sin( 2 * PI * seed3 )
    Quat.w = sqrt( seed1 ) * cos( 2 * PI * seed3 )
    Return Quat
```

```
RotateRandom(F)
    F = RotateAround(F,CM(F), RandomQuat( ))
    Return F
```

```
RotateAround(F,Rcm,Quat)
    M = QuatToMatrix(Quat)
    For every element p1 of F
        p' = p1 - Rcm
        p1 = M*p'+ Rcm
```

```
QuatToMatrix(Quat)
    M[0][0] = Quat.x^2 + Quat.y^2 - Quat.z^2 - Quat.w^2
    M[0][1] = 2 * Quat.y * Quat.z - 2 * Quat.x * Quat.w
    M[0][2] = 2 * Quat.x * Quat.z + 2 * Quat.y * Quat.w
    M[1][0] = 2 * Quat.x * Quat.w + 2 * Quat.y * Quat.z
    M[1][1] = Quat.x^2 - Quat.y^2 + Quat.z^2 - Quat.w^2
    M[1][2] = 2 * Quat.z * Quat.w - 2 * Quat.x * Quat.y
    M[2][0] = 2 * Quat.y * Quat.w - 2 * Quat.x * Quat.z
    M[2][1] = 2 * Quat.x * Quat.y + 2 * Quat.z * Quat.w
    M[2][2] = Quat.x^2 - Quat.y^2 - Quat.z^2 + Quat.w^2
    Return M
```

In an alternative implementation, rather than randomly choosing orientations, the convex hull of the sphere centers is computed. A subset of the orientations induced by the facet normals of the convex hull provide stable orientations.

Determine Stability

The rotated aggregates are analyzed to determine whether the result of the rotation is a stable orientation for the aggregate. The stability of an aggregate can be influenced by a number of factors, including the physical environment of the aggregate, such as the size, shape, and surface features, such as roughness or coefficient of friction, of a surface on which the aggregate is located.

In some implementations, process 600 of the method 100 calculates whether a test aggregate could stably rest on a surface having particular properties. For example, the process 600 may employ the Filter_Depth parameter, which can represent the roughness of a surface, such as a filter surface on which a real aggregate may have been collected. The following pseudocode provides an implementation of the IsBalanced function, which may be used to determine aggregate stability.

```
IsBalanced(F)
    C = { }
    min_height=infinity
    For every m of F
        If m.z<min_height
            min_height=m.z
    For every element p of F
        If InContact(p,F)
            C = C ∪ {p}
```

In the implementation shown above, the IsBalanced function calls a number of functions. For example, in determining whether an aggregate is stable, the IsBalanced function determines whether each element, such as a monomer, of the aggregate is in contact with a surface such that the element could support the aggregate structure on the surface. An example function, InContact, for determining whether an element is a point contact is represented by the following pseudocode:

```
InContact(point, F)
    If (point.z < min_height + FILTER_DEPTH)
        Return true
    Else
        Return false
```

According to the code above, for each element of the test aggregate, the InContact function determines whether the element is less than the sum of the minimum element size (such as diameter for particles having a circular cross section) and the roughness factor (FILTER_DEPTH) away from the surface. Only elements meeting that criterion are selected as contact points.

Once the set of possible contact points has been generated, the process 600 determines a plane that intersects the elements most likely to form the actual contact points. As three points define a plane, the IsBalanced function uses three points to determine the position of the fractal on the surface. However, often more than three elements of the aggregate will serve as contact points. To account for this possibility, the IsBalanced function determines three average points of contact using a weighting scheme.

The weighting scheme, in a particular example, is carried out by analyzing the set of possible contact points and identifying the set of three points that forms the largest triangle. According to the pseudocode below, triangles formed from various combinations of three contact points are used to generate the area of a triangle. If a triangle has an area larger than a previous standard, the contact points giving rise to the triangle are selected as the new standard. If a triangle does not exceed the previous maximum area triangle, the trial is typically discarded and the program moves on to analyze a new set of contact points. In other embodiments, the method 100 maintains a list of closest matches or maintains information on all possible orientations, possibly with an associated error or difference from the best trial.

```
max_area = 0.0
For every point1 of C
    For every point2 of C such that ! (point1 = point2)
        For every point3 of C such that !(point1 = point3)
    and !(point2 = point3)
        area = TriangleArea(p1,p2,p3)
        If (area > max_area)
            max_area = area
            group1_base = point1
            group2_base = point2
            group3_base = point3
Group1 = { }
Group2 = { }
Group3 = { }
```

The pseudocode above calls the TriangleArea function, described in the following pseudocode, to determine the area of a triangle formed by three test points:

```
TriangleArea(point1, point2, point3)
    A = point1.x - point3.x
    B = point1.y - point3.y
    C = point2.x - point3.x
    D = point2.y - point3.y
    Return 0.5 * abs(AD - BC)
```

The area of the triangle can be calculated using other formulae, such as trigonometric formulae, vectors, or Heron's formula. When the surface on which the fractal may rest is not flat, analogous concepts can be used, such as non-planar triangles, including spherical or hyperbolic triangles.

Once the three primary points of contact are chosen, as described above, the remaining points are classified into three groups depending on which of the three primary contact points they are closest to. Once all the points have been classified, the center of mass of each group is calculated. This process is represented by the following pseudocode:

```
For every element p1 of C
    d1 = 2dDistance(p1,group1_base)
    d2 = 2dDistance(p1,group2_base)
    d3 = 2dDistance(p1,group3_base)
    If d1 < d2,d3
        Group1 = Group1 ∪ {(p1.x,p1.y)}
    Else if d2 < d3
        Group2 = Group2 ∪ {(p1.x,p1.y)}
    Else
        Group3 = Group3 ∪ {(p1.x,p1.y)}
cm1 = CM(Group1)
cm2 = CM(Group2)
cm3 = CM(Group3)
Return WithinTriangle(CM(F),cm1,cm2,cm3)
```

An example of a 2dDistance function useable in the above-described process is set forth in the pseudocode below:

```
2dDistance(point1,point2)
    Return sqrt((point1.x – point2.x)^2 + (point1.y – point2.y)^2)
```

The center of mass of each group, as well as the overall aggregate, can be determined using the CM function, described in the pseudocode below:

```
CM(F)
    cm = origin
    For every element p of F
        cm += p
    If !(size(F) = 0)
        cm = cm / size(F)
    Return cm
```

The center of mass of each of the three groups is then used to form a set of three average contact points. The process 600 then determines whether the three-dimensional projection of the center of mass of the entire object lies within the triangle formed by the three average points of contact, which may be implemented using the WithinTriangle function, an example of which is described by the following pseudocode:

```
WithinTriangle(R_cm,cm1,cm2,cm3)
    A1 = TriangleArea(R_cm,cm1,cm2)
    A2 = TriangleArea(R_cm,cm1,cm3)
    A3 = TriangleArea(R_cm,cm2,cm3)
    Area = TriangleArea(cm1,cm2,cm3)
    If (A1 + A2 + A3 – Area) = 0
        Return true
    Else
        Return false
```

The WithinTriangle function takes the center of mass Rcm and the three average contact points, cm1, cm2, and cm3 (all projected into the two-dimensional plane), and determines whether triangle determined by (cm1, cm2, cm3) equals the sum of the areas of the triangles determined by (cm1, cm2, Rcm), (cm1, Rcm, cm3), and (Rcm, cm2, cm3). If so, the aggregate center of mass is determined to be within the triangle formed by the average contact points and the orientation deemed stable. If not, the orientation is not determined to be a stable orientation and is typically discarded. In further examples, the WithinTriangle function does not require the values to be equal, but within a certain range of being equal.

One consequence of this approach to determining aggregate stability is that is likely to conservatively determine aggregate stability, as the support area is likely larger than the triangle formed by the three average contact points. Although the pseudocode above provides a particular method for determining whether the center of mass of the aggregate is stable with respect to the points of contact, in a particular aspect, the present disclosure is not limited to this, or any, particular method. If desired, other contact point schemes can be used, including those which may more precisely describe the surface-contacting portion of the object.

In some examples, the rotation process 500 and stability determination process 600 are repeated for a predetermined number of times or until predetermined criteria have been met. Criteria may include time or until evaluation steps produce a desired result (such as a rotation producing the best result of the WithinTriangle function).

Post Processing

In process 700 (FIG. 1), two-dimensional parameters are generated for rotated aggregates from the processes 500 and 600, such as all stable orientations calculated in process 600. A variety of data can be returned regarding the above-described calculations. For example, one or more of the projected maximum area, length (sometimes abbreviated as $L_{max}$), width (sometimes abbreviated as $W_{max}$), and perimeter (sometimes abbreviated as P) may be calculated for a candidate aggregate. These parameters are typically collected during image processing of electron micrographs and thus can be useful for comparing experimental data against calculated structures. The program can also calculate the number of monomers in the projected image, $N_{proj}$.

Additional parameters that may be calculated by the program include two-dimensional fractal dimensions, such as the density fractal dimension or textural fractal dimension. These two-dimensional may be calculated by one or more methods. For example, the 'hybrid' method examines the relationship $P \sim L^{1-D}$ between the perimeter P of the aggregate's projection on an image plane and a 'yardstick' size L used for the measurement of the perimeter. Another method, the box counting method, is based on the relation $N \sim S^{-D}$ between the number of boxes N covering the cluster projection contour on the image plane and their size S. The perimeter fractal method uses the relation $N \sim S^{-D}$ between the number of boxes N through which the perimeter of the aggregate's image passes and their size S. Fractal dimension can also be calculated using the structure factor of the image and its slope, which is equal to D.

The properties determined in process 700 can be stored, such on computer readable medium, output to a display or a printing device, or transmitted, such as to a remote computer system.

In process 800, the image of one or more of the candidate aggregates from the process 700 are determined and displayed or otherwise output. The following pseudocode provides a CreateImage function that may be used to generate an image of an aggregate from the process 500.

```
CreateImage(F,C,r,POINTS_PER_RADIUS)
    M = { }
    Length = 0.0
    For every element, p, of F
        If(2dDistance(C,p) > Length)
            Length = 2dDistance(C,p)
    Length = Length + r
    Length = Length * 2
```

-continued

```
For xcoord from 0 to r * POINTS_PER_RADIUS
    For ycoord from 0 to r * POINTS_PER_RADIUS
        Temp = (xcoord/POINTS_PER_RADIUS * r -
            (Length/2.0) + C.x,
   ycoord/POINTS_PER_RADIUS * r - (Length/2.0) + C.y)
        For every element, p, of F
            If(2dDistance(p,Temp) < r)
                M = union(M, {Temp})
Return M
```

The function CreateImage creates an image of an aggregate F with an image pixel density or number of 2d-points per monomer radius defined by POINTS_PER_RADIUS. The CreateImage function raster-scans across the length of the aggregate and adds a point to the micrograph for every coordinate that is within a monomer radius of the 2d-projected center of a monomer within the aggregate.

Computer System/Program

Figure 3:
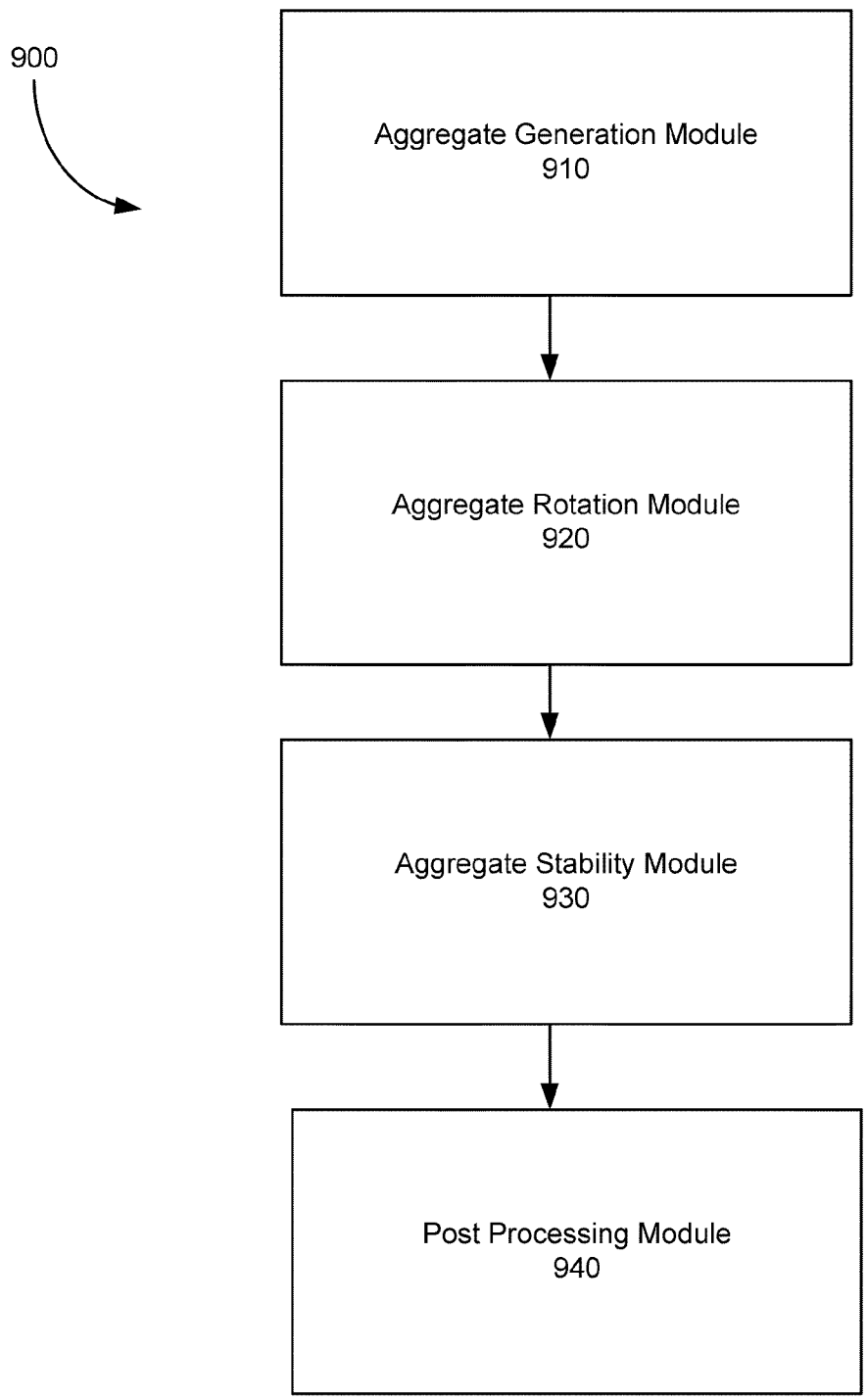
FIG. 3 is a schematic diagram of a system according to an embodiment of the present disclosure for implementing an embodiment of a method of the present disclosure.

FIG. 3 illustrates a schematic diagram of a system 900, such as a computer system, program, or combination thereof, for carrying out a method according to the present disclosure. The system 900 includes an aggregate generation module 910, which performs aggregate generation methods 300 and 400. The system 900 includes an aggregate rotation module 920, which carries out aggregate rotation methods 500 and 600. The system 900 further includes an aggregate stability module 930, which carries out stability determination process 700. Post processing module 940 may be used to carry out data processing method 800. Although shown as separate modules, one or more of the modules can be combined, in some implementations. In various configurations, the system 900 is implemented in hardware, software, or a combination thereof.

EXAMPLE

A computer program configured to carry out an implementation of the method of the present disclosure FracMAP was written in C++. The executable file output tab delimited data that was processed using common spreadsheet software such as Microsoft Excel. FracMAP printed the following to the screen:
Fractal Dimension?
Enter a value between 1.0 and 2.0.
Prefactor?
Enter a value greater than 1.0.
Fractal Size?
Enter an integer value greater than 0.
Choose an option to continue.
Fractal menu:
0: Exit
1: Clear current fractal and create a new fractal
2: Calculate Structure Factor of Current Fractal
3: 2D Image Analysis
4: Help
Enter an integer value either 0, 1, 2, 3, or 4 corresponding to the values above.

Corresponding output information was written to a user specified file. If option 0 is selected, the program exits. If option 1 is selected, the program clears its current fractal information and prompts the user for new parameters in order to construct a new aggregate. If option 2 is selected, the user is prompted for the target filename for an output file where the log normal values of Qval and Angsum are placed in tab delimited columns so that further analysis can be done using spreadsheet software such as Microsoft Excel. For example, the user can obtain the fractal dimension through linear regression of an appropriate data segment in log-log space. If option 3 is selected, the user is prompted for the target filename for an output file that includes the results of a comprehensive analysis of 25 projected, pixelated, 2-D images of unique stable orientations of the given 3-D fractal. That is, the program calculates the aggregate with the best radius of gyration (processes 200-400 of the method 100 of FIG. 1) and then outputs data for 25 stable orientations of that aggregate (such as using processes 500-600 of the method 100 of FIG. 1).

The output for the file has the following parameters for each of the 25 trials:
Nproj—Apparent number of monomers in the 2-d image
Area—Projected Area of the 2-d image
N—Actual number of monomers in the 2-d image
Lmax—Maximum length (in units, monomer radius is one unit) of the 2-d image
Wmax—Maximum perpendicular width to the given Lmax
2-d Fractal Dimension (Box Counting Method)
$R^2$ value for the linear regression to find the above value
2-d Hybrid Perimeter Fractal Dimension
$R^2$ value for the linear regression to find the above value
2-d Perimeter Fractal Dimension Method
$R^2$ value for the linear regression to find the above value
3-d Fractal Dimension
2-d Radius of Gyration
3-d Radius of Gyration A sample run of FracMap was performed using the following input parameters:
Fractal Dimension?
1.78
Prefactor?
1.3
Fractal Size?
25
Choose an option to continue.
Fractal menu:
3: 2-d Image Analysis
Output for this trial is presented in the table shown in FIG. 4.

The present application expressly incorporates by reference in its entirety: Chakrabarty, et al., "*FracMAP*: A User-Interactive Package for Performing Simulation and Orientation-Specific Morphology Analysis of Fractal-Like Solid Nano-Agglomerates," *Comp. Phys. Comm.*, 180, 1376-1381 (2009).

It is to be understood that the above discussion provides a detailed description of various embodiments. The above descriptions will enable those of ordinary skill in the art to make and use the disclosed embodiments, and to make departures from the particular examples described above to provide embodiments of the methods and apparatuses constructed in accordance with the present disclosure. The embodiments are illustrative, and not intended to limit the scope of the present disclosure. The scope of the present disclosure is rather to be determined by the scope of the claims as issued and equivalents thereto.

We claim:

1. In a physical computing device that implements an aggregate generation module, an aggregate rotation module, and an aggregate stability module, the physical computing device having a processor and memory, a computer implemented method for simulating an aggregate, comprising:

obtaining a test aggregate, the test aggregate comprising a plurality of monomers;

rotating the test aggregate to provide a rotated aggregate; and determining whether the rotated aggregate is stable, comprising:

defining a surface;

determining potential point contacts of the rotated aggregate with the surface;

determining a plurality of primary contact points from the potential point contacts;

classifying remaining potential point contacts according to which of the primary contact points they are closest to form a number of groups, the number of groups corresponding to the number of primary contact points;

determining the center of mass of each of the number of groups;

taking the center of mass of each of the groups to be a number of average contact points;

determining whether the three dimensional projection of the center of mass of the test aggregate lies within a triangle formed by the average points of contact;

if the center of mass falls within the triangle, determining the orientation to be stable.

2. The method of claim 1, wherein obtaining a test aggregate comprises building a test aggregate from a series of monomers.

3. The method of claim 2, wherein building a test aggregate from a series of monomers comprises iteratively adding monomers to a base monomer.

4. The method of claim 3, wherein each iteration yields a test aggregate, further comprising, for each iteration, calculating the radius of gyration of the test aggregate and only proceeding to the next iteration if the radius of gyration meets predetermined criteria.

5. The method of claim 1, wherein obtaining a test aggregate comprises:

adding a monomer to a base structure to produce a modified base structure;

determining whether the added monomer is a point contact to the modified base structure;

determining the radius of gyration of the modified base structure;

comparing the radius of gyration to a predetermined value and determining whether the modified base structure is a valid structure; and if the modified base structure is a value structure, repeating the adding, determining, and comparing steps until the modified base structure reaches a predetermined size; and using the modified base structure as the test aggregate.

6. The method of claim 1, further comprising:

obtaining two-dimensional data for a sample comprising aggregates;

calculating a two-dimensional property for the aggregates;

estimating a three-dimensional fractal dimension for the aggregates;

generating the radius of gyration of the test aggregate based on the estimated three-dimensional fractal dimension.

7. The method of claim 6, further comprising:

calculating a two-dimensional projection property of the test aggregate if the rotated aggregate is determined to be stable;

comparing the calculated two-dimensional projection property of the test aggregate to a reference value;

adjusting the three-dimensional fractal dimension based on the comparison;

adjusting the radius of gyration based on the updated three-dimensional fractal dimension, and repeating the steps of claim 1 based on the adjusted radius of gyration.

8. A tangible computer readable medium storing computer readable instructions for carrying out the method of claim 1.

* * * * *